United States Patent [19]
Markhoff-Matheny et al.

[11] Patent Number: 4,997,461
[45] Date of Patent: Mar. 5, 1991

[54] NITRIFIED BONDED SOL GEL SINTERED ALUMINOUS ABRASIVE BODIES

[75] Inventors: Carole J. Markhoff-Matheny, Leicester; John Hay, Shrewsbury; David Rostoker, Sturbridge, all of Mass.

[73] Assignee: Norton Company, Worcester, Mass.

[21] Appl. No.: 405,263

[22] Filed: Sep. 11, 1989

[51] Int. Cl.$^5$ .................................................. B24B 1/00
[52] U.S. Cl. ........................................ 51/295; 51/293; 51/298; 51/308; 51/309
[58] Field of Search ................... 51/293, 295, 298, 308, 51/309

[56] References Cited

U.S. PATENT DOCUMENTS

| | | | |
|---|---|---|---|
| 2,507,200 | 4/1950 | Elliot et al. | 117/121 |
| 2,878,111 | 3/1959 | Daniels et al. | 51/298 |
| 2,881,064 | 4/1959 | Rankin et al. | 51/295 |
| 3,041,156 | 6/1962 | Rowse et al. | 51/298 |
| 3,423,195 | 1/1969 | Steinberg | 51/295 |
| 3,489,541 | 1/1970 | Steinberg | 51/295 |
| 3,525,600 | 8/1970 | Yoshikawa et al. | 51/295 |
| 4,184,853 | 1/1980 | Otopkor | 51/295 |
| 4,314,827 | 2/1982 | Leitheiser et al. | 51/298 |
| 4,543,107 | 9/1985 | Rue | 51/309 |
| 4,574,003 | 3/1986 | Gerk | 51/309 |
| 4,623,364 | 11/1986 | Cottringer et al. | 51/293 |
| 4,744,802 | 5/1988 | Schwabel | 51/309 |

*Primary Examiner*—William R. Dixon, Jr.
*Assistant Examiner*—Willie J. Thompson
*Attorney, Agent, or Firm*—David Bennett

[57] ABSTRACT

Vitrified bonded abrasive bodies prepared from sol gel sintered aluminous grit particles and a vitreous (glass) bond exhibit improved abrasive performance by treating the surfaces of the grit particles so as to give them silica-enriched surfaces.

29 Claims, No Drawings

4,997,461

NITRIFIED BONDED SOL GEL SINTERED ALUMINOUS ABRASIVE BODIES

TECHNICAL FIELD

This invention relates to vitrified (glass) bonded sol gel aluminous sintered abrasive bodies, i.e. grinding wheels, segments, sharpening stones, and the like, which are modified before firing by the addition of a silica-generating material to enhance the grinding performance of such bodies.

It has been found that treating the surface of aluminous sol gel abrasive particles with a silica-generating material, e.g. colloidal silica or organic silicon-containing compounds such as silicates, silanes, silicon ethers, silicon esters, and silicones, greatly improves the grinding performance of the resultant vitreous-bonded abrasive articles. The treatments have been found effective when performed during in the manufacturing process before the abrasive particles are formed into an abrasive body.

BACKGROUND OF THE INVENTION

The present invention is particularly directed to vitrified bonded grinding wheels prepared with sol gel aluminous abrasive grain. Vitrified bonded grinding wheels are different from resinoid bonded, i.e. phenol-aldehyde, wheels in that they use a glass phase to bond the grain and thus are processed at substantially higher temperatures (about 800° C. or higher for vitrified vs. about 400° C. or lower for resin). Due to the higher manufacturing temperature used, vitrified bonded wheels can withstand higher temperatures in use than can resinoid bonded wheels. Also, it must be noted that sintered sol gel aluminous abrasive grain is known to be distinct from other aluminous abrasive grain, i.e. fused alumina. U.S. Pat. No. 4,543,107 discloses that vitrified wheels produced from sol gel grain must be processed at lower temperatures than similar wheels from fused alumina grain. Sol gel grain must be processed generally at about 1100° C. or less for conventional vitrified bonds and about 1220° C. or less for more viscous high alumina and silica bonds to yield satisfactory wheels.

Silicon-containing materials have been used as abrasive grain coatings and the like to provide improved properties for resinoid-bonded wheels, i.e. phenol-formaldehyde and the like, which are processed at relatively low temperature, but not with vitrified bond wheels. This is not surprising because siliconcontaining materials are known to improve the water-repellency of many articles and resinoid-bonded grinding wheels are known to suffer degradation due to the effects of cooling water present during use. The silicon treatments of grain for resinoid wheels effectively "waterproofs" the resinoid-bonded abrasive articles to prevent strength degradation and to increase retention of grinding grade throughout the useful life of the resinoid-bonded abrasive article. Since vitrified-bonded abrasive bodies are inherently resistant to degradation from water, such treatments have not been performed. Moreover, since vitrified-bonded bodies are subjected to extremely high temperatures for forming, one would expect any organic silane present to be destroyed by the temperatures and thus not effect the performance of the resultant grinding wheel. With conventional fused aluminous grain, the expected destruction of the silane does occur, as is shown below.

Also, vitrified bonded wheels have previously been impregnated with molten sulfur, as a grinding aid. The molten sulfur is placed on the wheel after it has been fired and thus can not affect the individual alumina grains used to form the wheel.

Cottringer et al, U.S. Pat. No. 4,623,364, and pending, commonly owned, U.S. applicationn. Ser. No. 023,346, filed Mar. 9, 1987, describe the preparation of various ceramic bodies, including abrasive grits, by heating gels of alumina monohydrate seeded with crystalline alpha alumina or other materials capable of facilitating the conversion of alumina monohydrate to crystalline alpha alumina. Such seeded sol gel alumina abrasive grits are characterized by submicron sized alpha alumina crystals, high hardness, and a greater density than the sol gel abrasive grits produced by the Leitheiser et al teachings in U.S. Pat. No. 4,518,397 which do not employ a seeding procedure. Similarly, Schwabel, U.S. Pat. No. 4,744,802, describes seeding or nucleating processes for producing dense, high hardness sol gel sintered alumina abrasive grits in which the nucleating agent is alpha ferric oxide.

For purposes of this application and the invention disclosed, the term "sol gel sintered alumina abrasive" is intended to apply to abrasives produced by the teachings of any one of U.S. Pat Nos. 4,518,397, 4,623,364, and 4,744,802, as well as other sol gel techniques used in the art.

SUMMARY OF THE INVENTION

It has been found that treating the surfaces of aluminous sol gel abrasive grit particles, either alone or in combination with other abrasives before the grit is formed into a vitreous-bonded grinding body, with a silica-generating material significantly improves the grinding performance of such bodies. The result is particularly unexpected since efforts to use the same treatments in the same manner with conventional fused aluminous abrasives, i.e. ones not prepared by a sol gel technique, yielded vitrified-bonded abrasive bodies showing no such improvement in grinding performance.

The phenomenon that has resulted in the improved grinding wheels is not fully understood, but is currently thought to be related to the increase in surface reactivity of very fine sol gel sintered aluminous abrasives as compared to much larger ultimate crystal size of conventional fused alumina abrasives.

DETAILED DESCRIPTION OF THE INVENTION

The vitrified bonded abrasive bodies of the present invention are comprised of sol gel aluminous grits, at least a portion of which have been treated with a silica-generating material, and a vitreous bond.

The aluminous grits are prepared by a sol gel technique which entails crushing and firing a dried gel prepared from a hydrated alumina such as microcrystalline boehmite, water, and an acid such as nitric acid. The initial sol may further include up to about 10-15% by weight of spinel, mullite, manganese dioxide, titania, magnesia, ceria, zirconia powder or a zirconia precursor which can be added in larger amounts, e.g. 40% or more, or other compatible additives or precursors thereof. These additives are normally included to modify such properties as fracture toughness, hardness, friability, fracture mechanics, or drying behavior. In its most preferred embodiment, the sol or gel includes a dispersed submicron crystalline seed material or a precursor thereof in an amount effective to facilitate the conversion of the hydrated alumina particles to alpha alumina upon sintering. Suitable such seeds are well known to the art. The amount of seed material should not exceed about 10 weight % of the hydrated alumina and there is normally no benefit to amounts in excess of about 5%. If the seed is adequately fine (preferably about 60 m$^2$ per gram or more), amounts of from about 0.5 to 10% may be used with about 1 to 5% being preferred. The seeds may also be added in the form of a precursor such as ferric nitrate solution. In general the seed material should be isostructural with alpha alumina and have similar crystal lattice dimensions (within about 15%) and be present in the dried gel at the temperatures at which the conversion to alpha alumina occurs (about 1000° to 1100° C.). The preparation of suitable gels, both with and without seeds, is well known in the art as are the crushing and firing procedures and thus further details thereon are readily available in the literature and are not included here.

Each aluminous grit so prepared is made up essentially of numerous noncellular alpha alumina crystals having crystal sizes of less than about 10 microns, preferably less than about 1 micron. The abrasive has a density of at least about 95% of theoretical density.

The aluminous grits are then treated with silica or a silicon compound which will generate silica on the surfaces of the grits during the firing of an abrasive body made with the treated grits. Any silicon-containing compound which yields a silica-enriched surface on individual grit particles either before or after firing may be used in the present invention. Silicon compounds suitable for use herein include colloidal silica as well as organic silicon-containing compounds such as silanes, silicates, silicon ethers, silicon esters, and silicones. The particular source of the silica-enriched surface has not been found to be critical, though different sources have been found to produce differences in grinding performance and the best results to date have been observed when colloidal silica has been used as the treating agent. The observed difference in performance may be due to the level of adherence of a particular silicon compound to the grit surfaces, or the extent of conversion of the silicon compound to silica under the particular firing conditions used, or the depth of the silica-enriched layer, or the degree of compression generated in the abrasive body by the presence of the silica.

Preferably, the silicon compound will be silica per se, e.g. colloidal silica or silica gel, or an organic silane, more preferably one having functional groups which will assist in producing a more uniform coating on individual sol gel aluminous grits. Examples of such functional groups include: amino, vinyl, acrylo, methacrylo, and mercapto. Silanes containing these functional groups are readily available from numerous commercial sources.

The treatment of the sol gel aluminous grits with the silicon compounds may be readily accomplished by uniformly blending the grits with the desired amount of the silicon compound with sufficient mixing to ensure uniformity. The treatment may be performed at any point in the manufacturing process before the grit and bond are formed into the desired abrasive body. Most conveniently, the silicon compound will be added to the grit with mixing as the first step in producing the abrasive body, followed by a precursor to the vitrified bond and any other desired ingredients. Alternatively, the grit can be pre-treated with the silicon compound by mixing them together and then storing the treated grit for subsequent use in forming an abrasive body. Since silicon compounds generally wet the surfaces of sol gel aluminous grit, nothing more than routine mixing has been found necessary with the specific silicon compounds evaluated.

As indicated, the abrasive bodies of the present invention are comprised of aluminous grits, at least a portion of which have been treated as described, and a vitrified bond. The specific amounts of abrasive and bond used may vary widely. Suitable compositions can range from about 3 to 76% bond, about 24 to 62% abrasive, and about 0 to 73% pores, all by volume. Preferably, the bodies will comprise about 3 to 39% bond, about 30 to 56% abrasive, and about 0 to 67% pores. Conventional pore inducing media such as hollow glass beads, solid glass beads, foamed glass particles, bubbled alumina, and the like may be incorporated into the present bodies thereby providing more latitude with respect to grade and structure number variations.

The abrasive products of this invention are bonded with a vitrified bond. Any conventional vitrified bond composition may be used in the present invention, provided that it does not mature at a temperature so high that there is a detrimental interaction between the bond and the sol gel aluminous grit. Generally a bond requiring a relatively low firing temperature, i.e. below about 1100° C., preferably below about 1000° C., will be used. Suitable vitrified bond compositions are commercially available from O. Hommel Company of Pittsburgh, PA, and others. The bond may include up to about 50% by volume fillers or grinding aids, as is well known in the art. Vitrified bonds, while amenable to the incorporation of fillers, somewhat limit the useful materials because of the high temperatures required to mature such bonds. Thus suitable fillers include such materials as kyanite, mullite, nepheline syenite, graphite, and molybdenum disulfide, depending upon the maturing temperature of a particular vitrified bond.

After firing at conventional conditions determined primarily by the actual bond used, the vitrified bonded body may be impregnated in a conventional manner with a grinding aid, such as molten sulfur, or with a vehicle, such as epoxy resin, to carry a grinding aid into the pores of the wheel.

In addition to fillers and grinding aids, the abrasive bodies may include one or more second abrasives in amounts of about 1 to 9% by volume of the total body. The second abrasive may act as a filler as, for example, if it is finer in grit size, or as an auxiliary or secondary abrasive, if it is coarser. In some grinding applications the second abrasive will function as a diluent for the coated sol gel aluminous abrasive grit. In other applications, the second abrasive may even enhance the overall grinding properties of the vitrified-bonded product, either in overall efficiency or in finish imparted to the material being ground. The second abrasive may be a fused alumina, cofused alumina-zirconia, sintered alumina-zirconia, silicon carbide, cubic boron nitride, diamond, flint, garnet, bubbled alumina, bubbled alumina-zirconia, and the like.

The treated sol gel abrasive grit and the vitrified bonded bodies containing said grit are, in general, superior to prior art untreated abrasives as the following examples show. The abrasive bodies are suitable for grinding all types of metal such as various steels like stainless steel, cast steel, hardened tool steel, cast irons, for example ductile iron, malleable iron, spheroidal graphite iron, chilled iron and modular iron, as well as metals like chromium, titanium, and aluminum. As is the case with all abrasives and the vitrified bonded bodies containing them, the abrasives and the bonded bodies of the invention will be more effective grinding some metals than others and will be more efficient in some grinding applications than in others. Outstanding portable, cut-off, precision, segment, track grinding, and tool sharpening wheels result when the abrasive utilized therein is the treated abrasive described herein.

In the following non-limiting examples, all parts and percents are by weight unless otherwise specified. Also, the term "abrasive grit" is used herein to refer to individual particles of the abrasive material.

EXAMPLE I

Sintered seeded sol gel alumina abrasive grits in ANSI size 54 were produced according to the teachings of commonly-owned U.S. Pat. No. 4,623,364 and used to make test wheels according to the teachings of U.S. Pat. No. 4,543,107. The procedures described therein were utilized except that the abrasive grits were treated respectively with 1.5% by weight of specific silicon containing compounds, i.e. various silanes or colloidal silica, immediately prior to mixing with the vitreous bond.

Test wheels 5" (127 mm) in diameter by ½" (12.7 mm) thick with 1¼" (31.75 mm) hole were made for the grinding tests with each variation. After firing the face of each wheel was reduced in width to ¼" (6.35 mm) before testing. The manufacturing procedure for each wheel was as follows:

Wheel A (Standard wheel)

1000 grams of 54 grit seeded sol gel sintered alumina abrasive was weighed into a mixing bowl and wetted with 29 cc of water. While mixing continued, 12 g of dextrin followed by 119.7 g of bond F, the composition of which is given in Table I, and 20 additional grams of dextrin were added. After two minutes of mixing following the final dextrin addition, the mix was pressed into wheels. Each wheel as pressed weighed 367.9 g and had a pressed volume of 168.05 cc.

Wheel B (Y 9576 TM treat)

1000 grams of 54 grit seeded sol gel sintered alumina abrasive was weighed into a mixing bowl and wetted with 15 g of phenylaminoalkyltrimethoxysilane obtained from Union Carbide Co. Tarrytown, NY, an Y9576 TM organo-functional silane. While mixing continued, 14 cc of water, 12 g of dextrin, 119.7 g of bond F and an additional 20 g of dextrin were added. Mix time, pressed wheel weights and volumes were the same as for Wheel A.

Wheel C (A1102 TM treat)

1000 grams of 54 grit seeded sol gel sintered alumina abrasive was weighed into a mixing bowl and wetted with 15 g of an aminosilane obtained from Union Carbide as A1102 TM organo-functional silane. While mixing continued, 14 cc of water, 12 g of dextrin, 119.7 g of bond F, and an additional 20 g of dextrin were added. Mix time, pressed wheel weights and volumes were the same as Wheel A.

Wheel D (Y9492 TM treat)

1000 grams of 54 grit seeded sol gel sintered alumina abrasive was weighed into a mixing bowl and wetted with 15 g of aminoalkyltrioxydisilane obtained from Union Carbide as Y9492 TM amino-functional silane. With continued mixing 50 cc of water, 12 g of dextrin, 119.7 grams of bond F, and an additional 20 g of dextrin were added. After two minutes of mixing, the mix was pressed into wheels with each wheel weighing 378.8 g as pressed and having a pressed volume of 168.05 cc.

Wheel E (colloidal silica treat)

1000 grams of 54 grit seeded sol gel sintered alumina abrasive was weighed into a mixing bowl and wetted with 15 g of colloidal silica obtained from E. I. DuPont Co., Wilmington, DE, as Ludox AS-40 TM. While mixing continued, 14 cc water, 12 g dextrin, 119.7 g bond F and an additional 20 g dextrin were added. After two minutes of mixing, the mix was pressed into wheels having pressed wheel weights and volumes as in Wheel A.

The composition of bond F, the vitreous bond used in all of the test wheels, is given Table I. Because this bond is a fritted bond, its unfired and fired compositions are the same.

TABLE I

| Fused Oxide Composition of Bond F, % by weight | |
|---|---|
| $SiO_2$ | 63.0 |
| $Al_2O_3$ | 12.0 |
| $Fe_2O_3$ | 0.1 |
| CaO | 1.1 |
| MgO | 0.1 |
| $Na_2O$ | 6.2 |
| $K_2O$ | 7.5 |
| $B_2O_3$ | 10.0 |
| Total | 100.0 |

Wheels A through E were each air dried and fired to 900° C. in air for 43 hours and then soaked at that temperature for 16 hours before being allowed to cool to room temperature. After firing, the wheels were prepared for a slot grinding test by reducing the width of the face to ¼" (6.35 mm).

A dry slot grinding test was made on D3 tool steel hardened to Rc60 with length of slot 16"(40.64 cm). Tests were made using a Brown and Sharpe surface grinder with wheel speed set to 6500 sfpm (33.02 smps) and table speed set to 50 fpm (0.254 mps). Tests were conducted at three downfeeds: 0.5, 1, and 1.5 mils per double pass (0.0127, 0.0254, and 0.0381 mm) all to a total of 100 mils (2.54 mm) except 100.5 mils (2.667 mm) at 1.5 mils downfeed. Wheel wear, metal removal, and power were measured at each infeed rate. The test results are shown in Table II.

TABLE II

| Dry Slot Grinding Results on D3 Steel | | | | | | |
|---|---|---|---|---|---|---|
| Wheel No. | Abrasive Treatment | Feed (mils) | G Ratio (S/W) | Quality ($S^2/W$) | Specific Power (Hp/-in³min) | (Joules/-mm³) |
| A | None | 0.5 | 57.8 | 4.18 | 2.13 | 5.81 |
|  |  | 1.0 | 47.5 | 6.97 | 2.99 | 8.16 |
|  |  | 1.5 | 41.8 | 9.25 | 3.63 | 9.91 |
| B | Y9576 TM | 0.5 | 58.2 | 4.22 | 2.29 | 6.25 |
|  |  | 1.0 | 60.8 | 9.18 | 3.39 | 9.25 |
|  |  | 1.5 | 61.6 | 13.64 | 4.23 | 11.55 |
| C | A1102 TM | 0.5 | 46.9 | 3.37 | 2.31 | 6.31 |
|  |  | 1.0 | 57.3 | 8.45 | 3.43 | 9.36 |
|  |  | 1.5 | 50.9 | 11.33 | 4.25 | 11.60 |

TABLE II-continued

Dry Slot Grinding Results on D3 Steel

| Wheel No. | Abrasive Treatment | Feed (mils) | G Ratio (S/W) | Quality ($S^2$/W) | Specific Power (Hp/-in$^3$min) | (Joules/-mm$^3$) |
|---|---|---|---|---|---|---|
| D | Y9492 TM | 0.5 | 55.0 | 4.22 | 2.15 | 5.87 |
|   |   | 1.0 | 60.8 | 9.19 | 2.96 | 8.08 |
|   |   | 1.5 | 88.4 | 19.58 | 3.67 | 10.02 |
| E | Colloidal Silica | 0.5 | 50.9 | 3.65 | 2.29 | 6.25 |
|   |   | 1.0 | 82.6 | 12.23 | 2.96 | 8.08 |
|   |   | 1.5 | 107.1 | 23.85 | 3.64 | 9.93 |

G-ratio, (S/W), as a measure of the volume of metal removed per unit volume of wheel wear is one of the measures of a grinding wheel's performance since it determines the total volume of metal removal before a wheel must be replaced. Another, even more significant measure of a grinding wheel's utility is the Quality measure ($S^2$/W) which takes into account not only the amount of metal that a wheel can remove but also the rapidity with which it does so. From the data in Table II, it is apparent that both G-ratio and Quality were markedly improved by all of the silica-generating wheel treatments tested. This is particularly true for the higher infeed rates which more nearly represent the condition of actual use of the wheels. At the heaviest infeed, wheel E (treated with colloidal silica) showed a G-ratio 156% greater and a Quality 158% greater than the untreated wheel A. Similarly, wheel D (Y9492 TM TM silane treated) showed a 111% greater G-ratio and a 112% greater Quality.

Example II

Wheels prepared as in Example I were further evaluated in grinding tests using a water-based coolant, E55 TM TM, from White & Bagley Company, Worcester, MA, diluted 1:40 with tap water. The tests were made on 4340 steel hardened to Rc55 with wheel speed set at 8500 SFPM (43.2 smps). Other test conditions were as in Example I, except that no 1.5 mil infeeds were made. The results of the wet grinding test are shown in Table III.

TABLE III

Wet Slot Grinding Results on 4340 Steel

| Wheel No. | Abrasive Treatment | Feed (mils) | G Ratio (S/W) | Quality ($S^2$/W) | Specific Power (Hp/-in$^3$min) | (Joules/-mm$^3$) |
|---|---|---|---|---|---|---|
| A | none | 0.5 | 163.4 | 11.1 | 2.54 | 6.93 |
|   |   | 1.0 | 89.4 | 13.0 | 4.03 | 11.00 |
| B | Y9576 TM | 0.5 | 214.1 | 18.7 | 2.23 | 6.25 |
|   |   | 1.0 | 119.4 | 18.4 | 4.51 | 12.31 |
| C | A1102 TM | 0.5 | 237.7 | 18.7 | 2.97 | 8.11 |
|   |   | 1.0 | 97.0 | 14.5 | 4.91 | 13.40 |
| D | Y9492 TM | 0.5 | 433.9 | 28.05 | 2.40 | 6.55 |
|   |   | 1.0 | 199.0 | 31.84 | 3.54 | 9.66 |
| E | Colloidal Silica | 0.5 | 360.4 | 18.65 | 2.31 | 6.31 |
|   |   | 1.0 | 155.8 | 20.18 | 3.96 | 10.81 |

Again, substantial improvement in grinding performance occurred with all of the treatments tested. Wheels D and E again showed the best results. Wheel D at 1/2 mil downfeed showed a 166% improvement in G-ratio and a 145% improvement in Quality. For the other treated wheels, improvements in G-ratio ranged from 31% for wheel B to 121% for wheel E while improvements in Quality ranged from 11% for wheel C to 70% for wheel E.

EXAMPLE III

A further series of test wheels was made using increasing amounts of silane Y9576 TM which had been used at a level of 1.5% in Wheel B in Example 1. Three additional test wheels F, G, and H were made using 0.5%, 1.0%, and 2% of silane Y9576 TM respectively. The manufacturing procedure was identical to that of wheel B except that 5, 10, and 20 g, respectively, of the Y9576 TM silane were used per 1000 grams of abrasive grits. Together with Wheel A (0%) and wheel B (1.5% Y9576 TM), wheels F, G, and H comprise a series in which increasing amounts of the silane were evaluated. The same procedures of test grinding, i.e. dry on hardened D3 steel and wet on 4340 steel, were used as in Examples I and II. The dry grinding results are shown in Table IV and the wet grinding results in Table V.

TABLE IV

Dry Slot Grinding Results on D3 Steel

| Wheel No. | Abrasive Treatment | Feed (mils) | G Ratio (S/W) | Quality ($S^2$/W) | Specific Power (Hp/-in$^3$min) | (Joules/-mm$^3$) |
|---|---|---|---|---|---|---|
| A | none | 0.5 | 57.8 | 4.18 | 2.13 | 5.81 |
|   |   | 1.0 | 47.5 | 6.97 | 2.99 | 8.16 |
|   |   | 1.5 | 41.8 | 9.25 | 3.63 | 9.91 |
| F | 0.5% Y9576 TM | 0.5 | 50.4 | 3.60 | 2.38 | 6.50 |
|   |   | 1.0 | 46.8 | 6.85 | 2.99 | 8.16 |
|   |   | 1.5 | 38.0 | 8.47 | 3.63 | 9.91 |
| G | 1.0% Y9576 TM | 0.5 | 54.7 | 4.18 | 2.17 | 5.92 |
|   |   | 1.0 | 64.1 | 9.42 | 3.12 | 8.52 |
|   |   | 1.5 | 48.7 | 10.89 | 3.83 | 10.46 |
| B | 1.5% Y9576 TM | 0.5 | 58.2 | 4.22 | 2.29 | 6.25 |
|   |   | 1.0 | 60.8 | 9.18 | 3.39 | 9.25 |
|   |   | 1.5 | 61.6 | 13.64 | 4.23 | 11.55 |
| H | 2.0% Y9576 TM | 0.5 | 48.1 | 3.61 | 2.20 | 6.01 |
|   |   | 1.0 | 54.0 | 8.06 | 3.25 | 8.87 |
|   |   | 1.5 | 75.0 | 16.58 | 4.29 | 11.71 |

TABLE V

Wet Slot Grinding Results on 4340 Steel

| Wheel No. | Abrasive Treatment | Feed (mils) | G Ratio (S/W) | Quality ($S^2$/W) | Specific Power (Hp/-in$^3$min) | (Joules/-mm$^3$) |
|---|---|---|---|---|---|---|
| A | None | 0.5 | 163.4 | 11.1 | 2.54 | 6.93 |
|   |   | 1.0 | 89.4 | 13.0 | 4.03 | 11.00 |
| F | 0.5% Y9576 TM | 0.5 | 164.1 | 11.2 | 2.40 | 6.55 |
|   |   | 1.0 | 97.6 | 14.7 | 3.73 | 10.18 |
| G | 1.0% Y9576 TM | 0.5 | 358.7 | 28.3 | 2.26 | 6.17 |
|   |   | 1.0 | 143.4 | 21.96 | 4.04 | 11.02 |
| B | 1.5% Y9576 TM | 0.5 | 214.1 | 18.7 | 2.23 | 6.25 |
|   |   | 1.0 | 119.4 | 18.4 | 4.51 | 12.31 |
| H | 2.0% Y9576 TM | 0.5 | 213.0 | 13.91 | 2.24 | 6.11 |
|   |   | 1.0 | 133.6 | 19.86 | 3.88 | 10.59 |

The dry grinding results in Table IV for this particular silane treatment indicate that increasing its amount above 0.5% improved performance and 1.5% was nearly as effective as 2.0%. The wet grinding results in Table V were similar in that 0.5% Y9576 TM had little effect. In this wet grinding test, it appears that 1.5% represents the optimum amount for this silane while both 1.0% and 2.0% loadings gave very similar performance.

COMPARATIVE EXAMPLE A

The procedures of Examples I and II were repeated except that the sol gel aluminous grit was replaced by a fused alumina abrasive having a few relatively large crystals, i.e. about 50 to 100 microns, and of similar high purity to the sol gel grit. Grinding wheels J and K were prepared as in Example I. Wheel J was like wheel A in that it contained no silicon-treated grit and wheel K was like wheel B in that 1.5% phenylaminoalkyltrimethoxysilane obtained from Union Carbide as Y9576 ™ organofunctional silane was mixed into the grit prior to adding the other wheel forming ingredients.

The two wheels were evaluated on the same materials as in Examples I and II under both dry and wet grinding conditions. The dry grinding results are shown in Table A and the wet grinding results in Table B.

TABLE A

Dry Slot Grinding Results on D3 Steel

| Wheel No. | Abrasive Treatment | Feed (mils) | G Ratio (S/W) | Quality ($S^2$/W) | Specific Power (Hp/-in$^3$min) | (Joules/-mm$^3$) |
|---|---|---|---|---|---|---|
| J | none | 0.5 | 11.6 | 0.81 | 273 | 7.45 |
|   |   | 1.0 | 13.9 | 1.95 | 4.24 | 11.57 |
|   |   | 1.5 | 14.1 | 2.97 | 4.93 | 13.45 |
| K | 1.5% Y9576 ™ | 0.5 | 9.3 | 0.62 | 2.81 | 7.67 |
|   |   | 1.0 | 11.4 | 1.56 | 4.13 | 11.27 |
|   |   | 1.5 | 13.0 | 2.73 | 5.02 | 13.70 |

TABLE B

Wet Slot Grinding Results on 4340 Steel

| Wheel No. | Abrasive Treatment | Feed (mils) | G Ratio (S/W) | Quality ($S^2$/W) | Specific Power (Hp/-in$^3$min) | (Joules/-mm$^3$) |
|---|---|---|---|---|---|---|
| J | None | 0.5 | 68.1 | 4.90 | 3.60 | 9.82 |
|   |   | 1.0 | 46.1 | 6.61 | 4.80 | 13.09 |
| K | 1.5% Y9576 ™ | 0.5 | 66.3 | 4.92 | 3.76 | 10.26 |
|   |   | 1.0 | 42.0 | 6.12 | 5.04 | 13.75 |

As can be readily seen from the similarity of results between the untreated and silane treated samples in both Tables A and B, the silane treatment did not change the grinding performance of the fused alpha alumina abrasive grit.

It is to be understood that means of enriching the surface of sol gel aluminous abrasives with silica other than those directly cited will be apparent to those skilled in the art and that these other means are intended to be within the scope of this invention.

What is claimed is:

1. A bonded abrasive body comprised of (i) sol gel sintered aluminous abrasive grit particles having silica-enriched surfaces and (ii) a vitrified bond.

2. The bonded abrasive body of claim 1, wherein the sol gel sintered aluminous abrasive grit particles are seeded sol gel sintered aluminous abrasive grit particles.

3. The bonded abrasive body of claim 1, wherein the sol gel sintered aluminous abrasive grit particles have a density of at least 95% of theoretical density and include up to about 50% by weight of an oxide selected from the group consisting of zirconia, titania, magnesia, ceria, spinel, hafnia, mullite, manganese dioxide, precursors of these oxides, and mixtures thereof.

4. The bonded abrasive body of claim 1, wherein the body consists essentially of about 24 to 62 volume % abrasive, about 3 to 76 volume % bond, and about 0 to 73 volume % pores.

5. The bonded abrasive body of claim 1, wherein the body consists essentially of about 30 to 60 volume % abrasive, about 3 to 40 volume % bond, and about 0 to 67 volume % pores.

6. The bonded abrasive body of claim 1, wherein said body further includes about 1 to about 90 volume percent of a second abrasive selected from the group consisting essentially of fused alumina, cofused alumina-zirconia, sintered alumina-zirconia, silicon carbide, cubic boron nitride, diamond, flint, garnet, bubbled alumina, bubbled alumina-zirconia, and mixtures thereof.

7. The bonded abrasive body of claim 1, wherein the vitrified bond includes up to about 30 volume % of a filler.

8. The bonded abrasive body of claim 7, wherein the filler is selected from the group consisting essentially of kyanite, mullite, nepheline, syenite, graphite, molybdenum disulfide, and mixtures thereof.

9. The bonded abrasive body of claim 1, wherein the body is a tool sharpening wheel.

10. The bonded abrasive body of claim 1, wherein the body is a precision grinding wheel.

11. The bonded abrasive body of claim 1, wherein the body is a creep feed wheel.

12. The bonded abrasive body of claim 1, wherein the body is a cut-off wheel.

13. The bonded abrasive body of claim 1, wherein the body is a portable wheel.

14. A method of producing sintered sol gel aluminous abrasive particles having silica-enriched surfaces which comprises coating said particles with a silicon compound and heat-treating the coated particles at a sufficient temperature and for a sufficient time to convert the silicon compound to silica and to fix the silica to the surfaces.

15. The method of claim 14, wherein the silicon compound is an organic silicon-containing compound selected from the group consisting essentially of silanes, silicates, silicon ethers, silicon esters, and silicones.

16. The method of claim 14, wherein the particles are coated with about 0.5 to about 3 weight percent of the silicon compound.

17. The method of claim 14, wherein the silicon compound contains at least one functional group selected from the group consisting of amino, vinyl, acrylo, methacrylo, and mercapto functional groups.

18. A method of producing sintered sol gel aluminous abrasive particles having silica-enriched surfaces which comprises coating said particles with a silica material and heat-treating the coated particles at a sufficient temperature and for a sufficient time to fix the silica to the surfaces.

19. The method of claim 18, wherein the silica is selected from the group consisting of colloidal silica and silica gel.

20. The method of claim 18, wherein the particles are coated with about 0.5 to about 3 weight percent of the silica.

21. A method of improving the grinding performance of a vitrified-bonded sintered sol gel aluminous abrasive body which comprises coating individual sintered sol gel aluminous abrasive grit particles which are used to prepare the body with about 0.5 to about 3 weight percent of a silicon compound and heat-treating the coated particles at a sufficient temperature and for a sufficient time to fix a silica coating to the surfaces of the particles and to form silica-enriched surfaces.

22. The method of claim 21, wherein the silicon compound is selected from the group consisting essentially of colloidal silica and silica gel.

23. The method of claim 21, wherein the silicon compound is selected from the group consisting essentially of silanes, silicates, silicon ethers, silicon esters, and silicones.

24. The method of claim 21, wherein the silicon compound is a silane.

25. The method of claim 24, wherein the silane contains one or more functional groups which assist in producing a uniform coating on individual sol gel aluminous grits.

26. The method of claim 25, wherein the functional group is selected from the group consisting essentially of amino, vinyl, acrylo, methacrylo, and mercapto functional groups.

27. The method of claim 24, wherein the silane is an amino silane.

28. The method of claim 27, wherein the amino silane is aminoalkyltrioxydisilane.

29. The method of claim 21, wherein the sol gel sintered aluminous abrasive grit particles are seeded sol gel sintered aluminous abrasive grit particles.

* * * * *